United States Patent [19]

Brown

[11] 4,086,430
[45] Apr. 25, 1978

[54] DETECTION CIRCUITRY

[75] Inventor: Kenneth Harvey Brown, Scottsdale, Ariz.

[73] Assignee: Motorola, Inc., Schaumburg, Ill.

[21] Appl. No.: 631,807

[22] Filed: Nov. 14, 1975

[51] Int. Cl.² .................. H04L 15/24; H04B 1/10
[52] U.S. Cl. .................................. 178/88; 325/324; 325/44
[58] Field of Search ............. 325/324, 474, 43, 44, 325/320; 340/168 R, 169; 329/146; 178/88

[56] References Cited

U.S. PATENT DOCUMENTS

| | | | |
|---|---|---|---|
| 3,392,336 | 7/1968 | Schroeder | 325/474 |
| 3,588,857 | 6/1971 | Gessner | 340/169 |
| 3,623,098 | 11/1971 | Jones | 325/324 |
| 3,815,029 | 6/1974 | Wilson | 178/88 |
| 3,828,263 | 8/1974 | Blomenkamp | 178/88 |
| 3,924,194 | 12/1975 | Cook | 329/146 |
| 3,925,614 | 12/1975 | Bousmar | 178/88 |

*Primary Examiner*—Benedict V. Safourek
*Assistant Examiner*—Michael A. Masinick
*Attorney, Agent, or Firm*—Eugene A. Parsons

[57] ABSTRACT

A detection circuitry designed to sense a composite signal of the type such as composite frequency shift keying (FSK) 50% amplitude modulated (AM) signal or pulse code modulated return to zero FSK type signal. The circuitry includes means for separating the composite signal into its constituent components and means for converting the separated signals into an amplitude envelope signal and a differentiated DC component. The circuitry includes a trigger circuitry for providing an output signal when the input thereof is of a predetermined polarity and amplitude and means including peak detection circuitry for applying the amplitude envelope and DC component so that the polarity of the differentiated DC component is applied to the trigger circuitry in the predetermined polarity so that the DC component is additive to the amplitude envelope, whereby the speed with which the trigger responds to the start and the end of the incoming composite signal is fast.

3 Claims, 3 Drawing Figures

DETECTION CIRCUITRY

BACKGROUND OF THE INVENTION

1. Field of the Invention

This invention relates to a detection circuitry and, more particularly, to an improved detection circuitry of the type designed to detect the start and the end of an incoming composite signal of the type such as frequency shift keying 50% amplitude modulated signal or pulse code modulated return to zero frequency shift keyed signal.

2. Prior Art

In many applications, it is important to provide a detection circuitry which is capable of detecting an incoming signal reliably and extremely fast, as in the space communications systems. There is a need for a receiver in the satellite or missile equipped to receive a short burst of command signal for self-destruct or other purposes. For example, should the missile go astray and pose danger, there is an urgent need either to correct the path or self destruct the missile.

In many areas of applications for communication purposes composite signal of a type such as composite frequency shift keying 50% amplitude modulated signal or pulse code modulated return to zero frequency shift keying signal is utilized as a command signal. Typically such a composite signal is repeated to introduce redundancy to assure that the receiver is given the opportunity to detect the signal. Yet the redundancy takes up time that could be utilized for communication of other signals.

Various attempts have been made to minimize the redundancy to save time but none heretofore have been completely satisfactory.

SUMMARY OF THE INVENTION

It is an object of the present invention to provide an improved high speed detection circuitry.

It is another object of the present invention to increase the reliability of a high speed detection circuitry in detecting the incoming signals. The foregoing and other objects of the present invention are attained by a detection circuitry that includes a plurality of channels for separating the composite signal of the aforementioned type into constituent component amplitude envelope signals, means for summing and differentiating the envelope signals and filtering the summed and differentiated envelope signals into a bandpass filtered signal having AC and differentiated DC components, output trigger means for generating an output upon detection of the input thereto when the amplitude thereof exceeds a predetermined amplitude and is of a predetermined polarity, and means interposed between the output trigger means and the summing, differentiating and converting means for setting the polarity of the DC component of the bandpass filtered signals so that it is of the same polarity as that of the predetermind polarity of the trigger means for hastening the speed with which the detection circuitry detects the start and end of the incoming composite signal.

It is a feature of the present invention wherein the summing, differentiating and filtering means include a plurality of resistors connected to the output of the plurality of channels a capacitor connected to the resistors for differentiating the output of the channels and a first operational amplifier and a filtering network in shunt with said operational amplifier for providing a predetermined bandpass filtering action to the summed and differentiated signal.

According to another feature of the present invention, there is provided circuit means, interposed between the trigger means and the summing, differentiated and filtering means, which includes a second operational amplifer coupled to the output of the first operational amplifier for inverting the output of the first operational amplifier and peak detection means for detecting the amplitude peak of the output of the second operational amplifier.

The foregoing and other objects and features of the present invention will be more clearly apprehended from the following detailed description of an illustrative embodiment of the present invention in connection with the accompanying drawings.

DETAILED DESCRIPTION

The high speed detection circuitry of the present invention is designed to detect an incoming signal of a certain type, such as a composite frequency shift keying 50% amplitude modulated signal as illustrated in FIG. 2A. It is to be noted that, while for the purposes of illustration, a composite FSK 50% amplitude modulated signal is shown detected by the present circuitry, other suitable signals of the same nature may be handled equally as well. Thus, for example, a pulse code modulated return to zero frequency shift keying signal may also be detected by the utilization of present high speed detection circuitry with minimal modification designed to cope with the digital nature of the pulse code modulated signal rather than the amplitude modulated composite FSK signal.

Referring to FIG. 2A, the composite FSK 50% AM signal may be made of a composite signal to be separated into a given number of channels, for example, three channels of frequency shift keying signals of 25 KHz, 35 KHz, and 45 KHz, in channel 1, channel 2, and channel 3. In space communications, such frequency shift keying composite signal is repeated a number of cycles, typically 15 to 20 times, in forming a burst of a command signal, although, in FIG. 2A, only three cycles of such composite signal are shown. Also it is to be understood that whereas in the present specification the AM signal is said to be 50% amplitude modulated the percentage of modulation is for illustrative purpose only. The percentage of modulation may vary as much as 30 to 70%.

Figure 1:
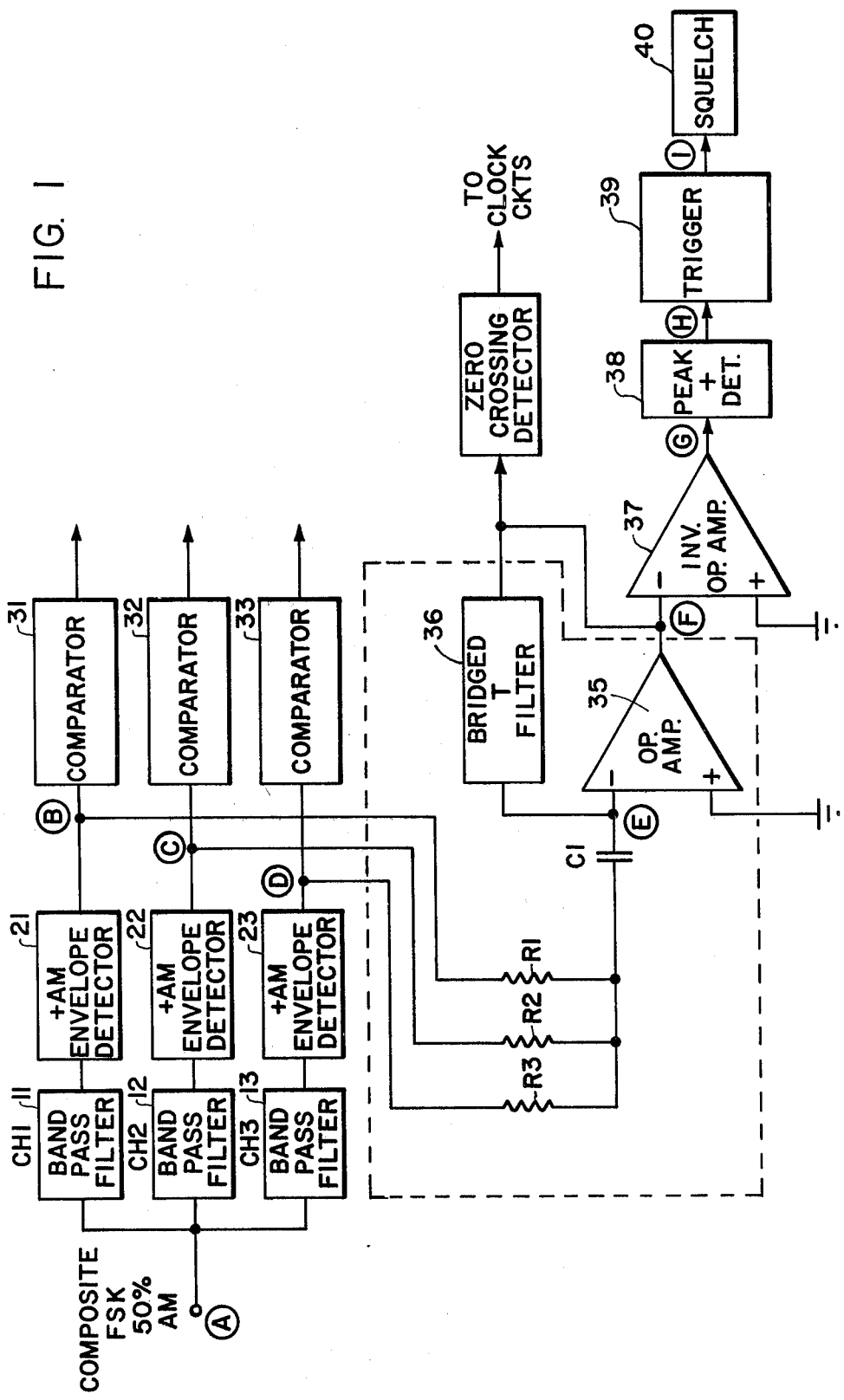
FIG. 1 shows a block diagram of a detection circuitry according to the present invention.

Referring to FIG. 1, the incoming signal of the composite nature is then applied to the corresponding channels, channel 1, channel 2 and channel 3 which include bandpass filters 11, 12 and 13 and the envelope detectors 21, 22 and 23 of the amplitude modulated signals in a conventional manner. In this manner, each channel provides the envelopes of the frequency shift keying AM signals that the channel is designed to detect. This is illustrated in the waveforms B, C and D, showing the envelopes of the frequency shifted signals of channels 1, 2 and 3 shown in FIG. 2, A. Typically, the output of such detectors are applied to comparators 31, 32, 33 for subsequent utilization for certain purposes. The channels with the bandpass filters and the envelope detectors described above are of conventional type and therefore do not call for any further description.

In accordance with an aspect of the present invention the envelopes of the constituent components of the composite signal provided by the envelope detectors of the plurality of channels are then summed via suitable means such as resistive means R1, R2 and R3 and differentiated by a capacitive means C1. The differentiated signal is then fed through an inverting operational amplifier 35 and filtered by a filter network 36 connected in shunt with said operational amplifier 35. The filter network 36 may be of a conventional bridged T type filter network for a wider band width or twin T type network for a narrow band width filtering operation.

The twin T or bridge T type filter network may be of any conventional design and the selection depends principally on the amount of the noise signal present that the designer would want to eliminate to meet his overall signal-to-noise design criteria. The summed, differentiated and filtered output is graphically illustrated in FIG. 2 $E_{AC}$, $E_{DC}$, and $E_{COMP}$. $E_{COMP}$ represents the signal waveform output at the operational amplifier/filter parallel network, before its polarity is inverted (in actuality, because of the inversion caused by the inverting operational amplifier the polarity of $E_{COMP}$ is reverse of that in FIG. 2; $E_{COMP}$). The output comprises two constituent components. One is the AC output of the operational amplifier represented by FIG. 2 $E_{AC}$ indicating the AC component of the $E_{COMP}$. The second constituent component is the differentiated output due principally to the RC differentiation performed by the network made of the resistors R1, R2 R3 and capacitor C1. Note that the DC component contributed by the RC differentiating network is of a transient type; thus, for example, at the leading edge or the start of the incoming signal a positive kick 41 of DC signal is formed.

However, because of the differentiating nature of the RC coupled circuitry, the capacitor reaches a peak average level essentially contributed by the leading edge of channel 1 envelope signal (FIG. 2B). Then, the capacitor begins to discharge as the envelopes B, C and D provided by the envelope detectors repeat themselves and provide the alternating current signal ($E_{AC}$).

At the end of the burst of incoming coded signals, i.e., when the incoming code signal terminates, the last of the envelope (FIG. 2D) causes the capacitor C1 suddenly to charge in the opposite direction and then begins to discharge exponentially. This is illustrated in the second differentiated DC signal component in the form of negatively peaked voltage which begins to discharge exponentially. This is shown in 43 of FIG. 2,$E_{DC}$. The composite of the AC component and DC components, illustrated in FIGS. 2 $E_{AC}$ and $E_{DC}$, results in the composite waveform shown in $E_{COMP}$. Here note that the sinusoidal waveform of the AC component is lifted at the beginning 44 due to the positive contribution of the differentiated DC component $E_{DC}$ and is yanked down to the negative direction at the tail end 45 of the signal by the negatively going differentiated signal.

Figure 2:
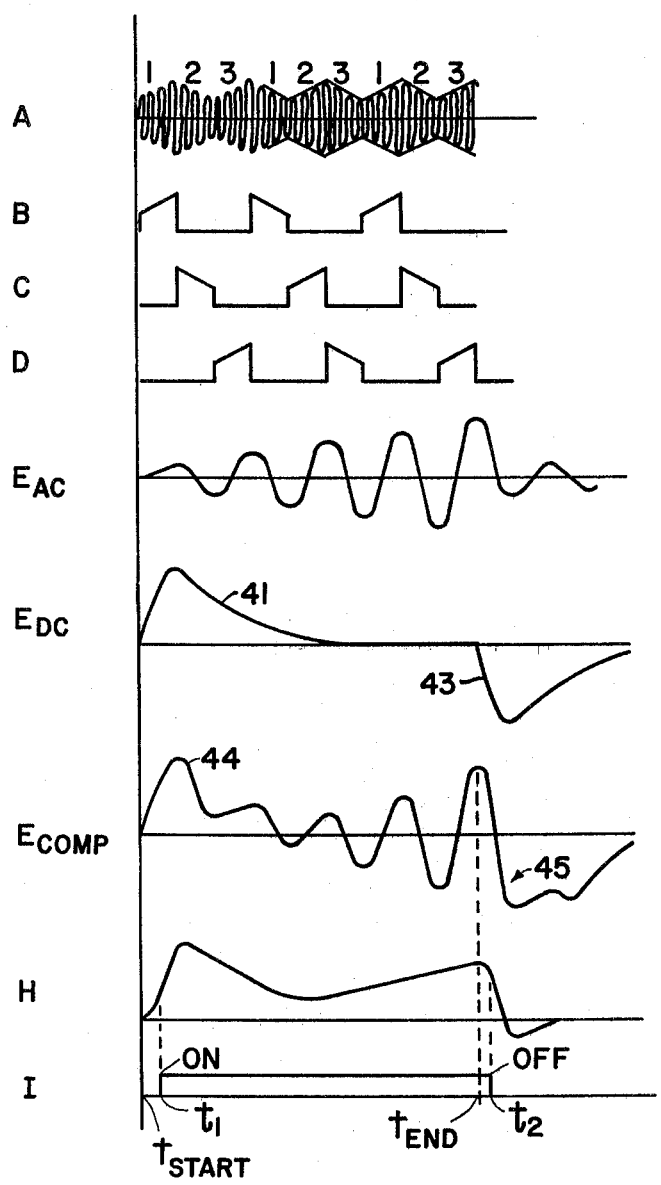
FIG. 2 shows timing wave forms helpful in the understanding of the operation of the present detection circuitry.

The resulting composite signal wave form is shown in FIG. 2, $E_{COMP}$ where $E_{COMP}$ is shown in positive polarity; but the operational amplifier as illustrated in FIG. 1, is connected to invert the input. So the composite signal that actually appears at the output of the operational amplifier is inverse of the composite signal shown in FIG. 2 $E_{COMP}$. This composite signal is then inverted into the positive form as shown in FIG. 2, $E_{COMP}$ by another inverting operational amplifier 37 and then applied to a peak detector 38.

The peak detector 38 is of a conventional design which detects the peaks of the AC signal output of the operational amplifier 37 (FIG. 2H). The peak detector output is then applied to a sensing circuitry, including a trigger circuit 39 and squelch circuit which senses and provides an output (FIG. 2I) when the output of the peak detector 38 exceeds a certain predetermined amplitude and polarity.

Referring to FIG. 2H and 2I, there is clearly illustrated the timing of the start of the output from the trigger circuit 39 at time $t_1$ which is sometime after the start of the incoming composite signal $T_{START}$. This takes place when the peak detector 38 detects that the amplitude of the composite signal $E_{COMP}$ at the output of the inverting amplifier 37 reaches a certain predetermined amplitude. The trigger circuit 39 terminates its output at time $t_2$ which occurs some time delay after the ending of the incoming signal. The output of the trigger circuit 39 at time $t_2$ is due to the transient effect of the composite signal before it decays to a level where the trigger is turned off by the peak detector.

Figure 3:
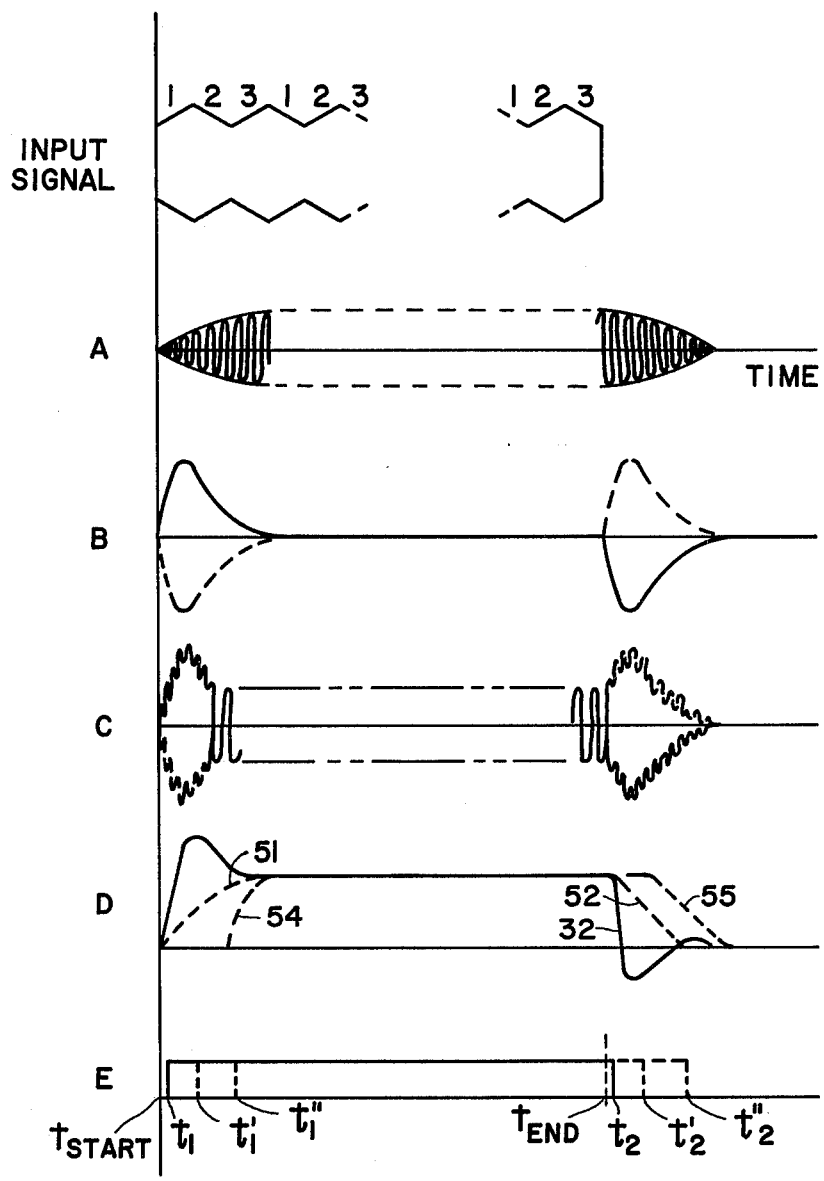
FIG. 3 shows a timing diagram of the operation of the present circuitry which illustrates its high speed response characteristics.

The advantages provided by the present high speed detection circuitry is clearly illustrated also in FIG. 3. FIG. 3A illustrates the AC component of the output of the filter differentiator-amplifier network (FIG. 1: C1, 35, 36) after the incoming signal is separated into the constitutent channels, and envelope detected, differentiated and filtered. FIG. 3B, solid line curves illustrates the differentiated DC component. FIG. 3C solid line illustrated the composite of the AC and DC components shown in FIGS. 3A and 3B. FIGS. 3C, 3D and 3E show three situations involving different time delays in the sensing of the start and ending of the incoming signal.

First situation illustrates the effect of the present invention. The solid curves in FIGS. 3C, 3D and 3E illustrate the effect of the present inventive detection circuitry; in this case, the differentiated DC component is positively applied to the peak detector in the same polarity as the peak detector is designed to sense to reinforce, that is, yank up the beginning of the AC component at the start of the incoming signal and is negatively applied to yank down the tail end or the end portion of the AC component at the end of the incoming signal. As illustrated, the start of the input signal is sensed at a time, $t_1$ (FIG. 3E) and the end is sensed at the time, $t_2$ (FIG. 3E).

A second situation is where the differentiated DC (FIG. B) is not provided in the detection process and this is the case in most of the prior art devices. The result is that the peak detected by the peak detector circuitry follows, in its amplitude, essentially the speed with which the AC component (FIG. 3A) increases or decreases following the start and the end of the input signal. This is shown by the broken lines 51 and 52 in FIG. 3D. The result is that the detection of the beginning and the ending of the incoming signal takes place at times $t_1'$ and $t_2'$. As evident from FIG. 3,E, the delay experienced by the trigger in sensing the start and end of the incoming signal is significant compared to the corresponding speed of the sensing of the start and ending of the incoming signal with the present invention (compare $t_1$ to $t_1'$ and $t_2$ to $t_2'$ relative to $T_{START}$ and $T_{END}$ respectively).

The third situation is in connection with the use of the inventive circuitry of the present invention. Care has to be taken to assure that the effect of the differentiated DC is not applied in the opposite sense to the trigger to the detriment of the detector in sensing the start and end of the incoming signal. If allowed to take place the delay in the speed of detection will be worse as shown by the broken composite line curve in FIG. 3C and its effect in FIG. 3D, 54 and 55 and delay shown by the sensing time $t_1''$, and $t_2''$ in FIG. 3E.

The need for having the inverting amplifiers is to pole the differentiated DC component so that it is additively applied to the peak detector. This is evident from the curves in FIGS. 3B and C, and FIG. 3D, 54 and 55 and FIG. 3E, $t_1''$, $t_2''$. Referring to FIG. 3, if the differentiated DC component is not added and applied in the same polarity as the trigger is poled, for example, for a positively poled trigger, i.e., a trigger circuitry designed to sense the positive going signal, then the adverse effect is dramatic, as illustrated in FIGS. 3; B, C, D and E. As illustrated therein the effect is this; the DC component tends to distract rather than contribute to the process of marking the start and end of the sensed incoming signal. As illustrated in FIGS. 3C, D and E, the composite result of the negatively going differentiated DC component FIG. 3B added to the AC component and then applied to the peak detector and then to the trigger will result in the delay of the sensing of the start (FIG. 3E, $t_1''$) and end (FIG. 3E, $t_2''$) of the incoming signal as illustrated in FIG. 3E.

Note that FIG. 3 illustrates more generalized and more representative situations usually encountered in the space communication. According to the conventional scheme the frequency shift keying 50% AM signal code may be repeated in a string in cycles 1, 2, 3 . . . to *n* where *n* may reach 15 to 20. In other words 15 to 20 redundancy is introduced for allowing a conventional slow detection circuitry time to catch the signal. In practical applications with the conventional detection circuitry, it has been found that it takes 8 to 15 cycles of the incoming signal before the detector is capable of sensing the arrival or the start of the incoming signal and takes as much time delay in sensing the termination of the incoming signal. As a result of the advantageous innovation of the summing, differentiating, and filtering networks for deriving a differentiated DC component and the application of the DC component in the additive sense to a trigger for yanking up the start of the sensed AC envelope to accentuate the amplitude of the sensed signal and yanking down the end to deemphasize the AC envelope after the end of the incoming signal, as explained above, the inventive detection circuitry has substantially increased the sensitivity and speed with which it senses the start and end of the incoming signal. For example, with the present detection circuitry now redundancy of three to five cycles are found sufficient delay to assure the detection.

In many applications it is important and advantageous to eliminate the repetition of the coded signal as much as possible. This is so in the space or other communication systems not only for reasons of saving the time for other communications purposes but also minimizing the time utilized for the command signal sending and receiving operations. The advances made by this invention is especially significant in many of the modern, sophisticated communications systems, in particular in the satellite communications systems, where multitudes of function must be commanded from the ground station within limited amount of time. Therefore any reduction in the amount of time required to transmit and receive is placed at a premium.

As a result of the present advantageous invention the command signal transmission and reception can be shortened substantially, to the extent of one half of even one third by eliminating that much repeat signal or redundancy. Such an advantageous invention can be applied in many applications where fast response at minimum duration command code signals is at a premium. For example, in the command destruct receiver of the kind that may be utilized for self destroying a missile which may fail to follow a proper path and thus pose tremendous danger. The missile is commanded by the ground control station with a shorter burst of command signal than priorly possible by utilizing the present inventive receiver detector which responds faster and more reliably than prior art detection circuitry.

Various modifications and changes will be apparent to one of ordinary skill without departing from the spirit or the scope of the present invention as exemplified and described in the detail hereinabove. For example, while in the illustrative embodiment in FIG. 1, two inverting amplifiers are shown in series so that they provide a positively poled signal to the positively poled peak detector, this is done to take advantage of readily available peak detectors which are positively poled, but if a negatively poled detector is readily available then, only the first inverting amplifier need be used.

What is claimed is:

1. Detention circuitry for detecting an incoming composite signal of the type, such as Frequency Shift Keying 50% amplitude modulation (FSK 50% AM) or FSK-PCM (pulse code modulation) return-to-zero signal, comprising a plurality of channels for separating the composite signal and forming amplitude envelope signals the corresponding constituent signals forming the composite signal, means connected to said plurality of channels for summing and differentiating the envelope signals and filtering the summed and differentiated envelope signals into a bandpass filtered signal that is a composite of an AC and differentiated DC components, output means for generating an output signal upon detection of a required input signal thereto having an amplitude which exceeds a predetermined value and a predetermind polarity, and means interposed between said output means and said summing, differentiating and filtering means for setting the polarity of the DC component of the bandpass filtered signal so that the DC component is the same polarity as that of the required input signal of said output means for hastening the speed of the output means in sensing the start of the incoming composite signal.

2. Detection circuitry according to claim 1, wherein said summing, differentiating and filtering means includes a plurality of resistive means connected to the output of said plurality of channels, capacitive means connected to the plurality of resistive means for differentiating the output of the channels summed by said resistive means, first operational amplifier and a filtering network in shunt with said first operational amplifier for providing a predetermined bandpass filtering action to the summed and differentiated signal.

3. The detection circuitry according to claim 2 wherein said means interposed between said output means and said summing differentiating and filtering means includes a second operational amplifier coupled to the output of said first operational amplifier for inverting the output of said first operational amplifier, and peak detection means for detecting the amplitude peak of the output of said second operational amplifier.

* * * * *